UNITED STATES PATENT OFFICE.

ARNOLD BRUNNER, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

FLUORESCEÏN DYESTUFF AND PROCESS OF MAKING SAME.

990,224. Specification of Letters Patent. Patented Apr. 25, 1911.

No Drawing. Application filed May 23, 1910. Serial No. 562,978.

*To all whom it may concern:*

Be it known that I, ARNOLD BRUNNER, Ph. D., chemist, a citizen of the Empire of Germany, residing at Höchst-on-the-Main, Germany, have invented certain new and useful Improvements in New Fluoresceïn Dyestuffs and Processes of Making Same, of which the following is a specification.

Fluoresceïns chlorinated in the resorcinol-nucleus, as obtained, for instance, by the action of chlorin upon fluoresceïns, or by combination of chlororesorcinol with phthalic acids, are not capable of receiving any further quantity of chlorin without the dyestuffs being thereby destroyed. However, I have found that bromin and iodin can still be introduced into such chloro-fluoresceïns. Thus, new dyestuffs of great value are obtained, which, on the one hand, are distinguished from the parent products by their much more intense blue and brighter tint; on the other hand, very much resemble the corresponding dyestuffs containing only iodin or bromin, so that it is possible, without impairing their tinctorial power, to partly substitute the chlorin, which is cheaper in price, for the more expensive halogens.

Example I: 20 kgr. of dichlorofluoresceïn, produced from chlororesorcinol and phthalic acid, are suspended in alcohol and 16 kg. of bromin are added. The temperature of the reaction mass rises and after a short time the product is separated from it. This product consists of red, brilliant laminae difficultly soluble in water, alcohol and ether, readily soluble in aqueous alkalis with a red color and green fluorescence. It dyes wool eosin-like tints.

Example II: 13 kg. of iodin are introduced in the usual manner into 15.8 kg. of the chloro-substitution product obtained by the action of chlorin upon fluoresceïn. The product, which is of a red color, is difficultly soluble in water, alcohol and ether; its alkali salts dissolve in water with a bluish-red color without fluorescence. The dyeings obtainable by the product are similar to those produced by erythrosin (tetraiodfluoresceïn).

Having now particularly described my invention, what I claim is:

1. The process of manufacturing fluoresceïns containing in the resorcinol-nucleus chlorin and another halogen of higher atomic weight, which consists in causing such a halogen to act upon fluoresceïns containing chlorin in the resorcinol-nucleus.

2. As new products, fluoresceïn dyestuffs containing in the resorcinol-nucleus chlorin and another halogen of higher atomic weight, which dyestuffs form red powders, insoluble or difficultly soluble in water and alcohol, readily soluble in alkalis, and dyeing, in an acetic bath, wool, cotton and silk bright red tints.

3. As a new product, a fluoresceïn dyestuff containing in the resorcinol-nucleus chlorin and bromin, which dyestuff forms a red powder, insoluble or difficultly soluble in water and alcohol, readily soluble in alkalis, and dyeing, in an acetic bath, wool, cotton and silk bright red tints.

In testimony whereof, I affix my signature in presence of two witnesses.

ARNOLD BRUNNER.

Witnesses:
JEAN GRUND,
CARL GRUND.